(12) United States Patent
McGee

(10) Patent No.: US 11,682,756 B2
(45) Date of Patent: Jun. 20, 2023

(54) METHOD OF MAKING HIGH CAPACITY ELECTRODE MATERIAL

(71) Applicant: Hamilton Sundstrand Corporation, Charlotte, NC (US)

(72) Inventor: Randolph Carlton McGee, Hamden, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 31 days.

(21) Appl. No.: 17/378,609

(22) Filed: Jul. 16, 2021

(65) Prior Publication Data

US 2021/0344000 A1 Nov. 4, 2021

Related U.S. Application Data

(62) Division of application No. 16/460,608, filed on Jul. 2, 2019, now Pat. No. 11,094,923.

(51) Int. Cl.
*H01M 4/00* (2006.01)
*H01M 4/1391* (2010.01)
*H01M 4/04* (2006.01)
*H01M 4/1395* (2010.01)

(52) U.S. Cl.
CPC ....... *H01M 4/1391* (2013.01); *H01M 4/0471* (2013.01); *H01M 4/1395* (2013.01)

(58) Field of Classification Search
CPC ...... H01M 4/66; H01M 4/5825; H01M 4/661; H01M 4/623
See application file for complete search history.

(56) References Cited

U.S. PATENT DOCUMENTS 6,482,374 B1* 11/2002 Kumar ............... C01G 45/02
423/599
8,920,975 B2 12/2014 Oki et al.
9,178,214 B2 11/2015 Mah et al.
10,044,038 B2 8/2018 Bridges et al.
10,128,489 B2 11/2018 Parans Paranthaman et al.
(Continued)

FOREIGN PATENT DOCUMENTS

EP 0744782 A1 11/1996

OTHER PUBLICATIONS

Hanai K et al: "Electrochemical behavior of the composite anodes consisting of carbonaceous materials and lithium transition-metal nitrides for lithium-ion batteries", Solid State Ionics, North Holland Pub. Company. Amsterdam; NL, NL, vol. 179, No. 27-32, Sep. 30, 2008 (Sep. 30, 2008), pp. 1725-1730, XP023521371.
(Continued)

*Primary Examiner* — Cynthia H Kelly
*Assistant Examiner* — Monique M Wills
(74) *Attorney, Agent, or Firm* — Locke Lord LLP; Daniel J. Fiorello; Gabrielle L. Gelozin

(57) ABSTRACT

A method of manufacturing lithium-metal nitride including suspending a lithium-metal-oxide-powder (LMOP) within a gaseous mixture, incrementally heating the suspended LMOP to a holding temperature of between 400 and 800 degrees Celsius such that the LMOP reaches the holding temperature, and maintaining the LMOP at the holding temperature for a time period in order for the gaseous mixture and the LMOP to react to form a lithium-metal nitride powder (LMNP).

18 Claims, 4 Drawing Sheets

(56) References Cited

U.S. PATENT DOCUMENTS

2010/0297504 A1* 11/2010 Oki .................. H01M 10/0525
429/231.95
2016/0329565 A1* 11/2016 Shin ................... H01M 4/5825

OTHER PUBLICATIONS

Extended European search report issued in correspning EP Application No. 19215229.6, dated Apr. 17, 2020.

* cited by examiner

METHOD OF MAKING HIGH CAPACITY ELECTRODE MATERIAL

CROSS-REFERENCE TO RELATED APPLICATION

This application is a divisional application of U.S. patent application Ser. No. 16/460,608 filed on Jul. 2, 2019, which is incorporated herein by reference in its entirety.

BACKGROUND

Technological Field

The present disclosure relates to a method of making electrode material, and more particularly to a method of making electrode material using commercially available stock.

Description of Related Art

Aircraft systems use lithium-ion batteries (LiB) for backup and auxiliary power, engine-startup, etc. due to their quick recharging capabilities, high voltage and current capabilities, and power quality. Graphite, the most widely used LiB anode material has high reversibility, but low specific capacity. Lithium-transition-metal-nitrides (LTMN) are great alternatives to LiB with high, stable, and reversible capacities and a longer cycle life, but typical production methods are small-scale, time consuming, and yield low surface area materials. Additionally, LTMN powders are typically prepared by mixing and grinding $Li_3N$ and metal powders, pressing the mixture into a pellet, and heating in a nitrogen donating gas for at least 12 hours to 5 days. The product then has to be ground and mechanically milled. The process is lengthy and dangerous. The processes require highly flammable and reactant ingredients, specifically the lithium nitrides.

When compared to traditional rechargeable battery systems, rechargeable lithium-ion batteries (LiBs) have been identified as attractive alternative power sources for numerous applications such as electrical vehicles (EVs), hybrid electrical vehicles (HEVs), and stationary energy systems. A typical LiB is composed of several electrochemical cells either connected in series and/or parallel to provide the desired voltage and capacity. Each cell is comprised of a positive (cathode) and negative (anode) electrode which are separated by an electrolyte solution containing dissociated salts which allows ion transfer between the two electrodes.

To date, the typically used method for preparing lithiated transition metal nitride powders involves mixing $Li_3N$ and the desired metal powder in the appropriate quantities, followed by grinding. The powder mixture is then pressed into a pellet, and heated under nitrogen donating atmosphere (typically $N_2$) for 12 hours to 5 days. In some instances, the products are then ground in a glove box and further treated by high-energy mechanical milling (HEMM). This approach is very time consuming with many separate steps as well as very energy intensive. In addition, the final materials are typically, low surface area and very sensitive to air exposure.

Therefore, there is still a need in the art for a method of manufacturing lithium-ion batteries having improved using safer, and less reactant methods, specifically a need for Li-ion battery anode materials with larger reversible capacity and higher stability and cycle life and a need for a more efficient method for preparing lithium transition metal nitride nanopowders. There also remains a need in the art for such methods that are economically viable. The present disclosure may provide a solution for at least one of these remaining challenges.

SUMMARY OF THE INVENTION

A method of manufacturing lithium-metal nitride includes suspending a lithium-metal-oxide-powder (LMOP) within a gaseous mixture, incrementally heating the suspended LMOP to a holding temperature of between 400 and 800 degrees Celsius such that the LMOP reaches the holding temperature, and maintaining the LMOP at the holding temperature for a time period in order for the gaseous mixture and the LMOP to react to form a lithium-metal nitride powder (LMNP) and forming a battery electrode from the lithium-metal nitride powder.

The method can include cooling the suspended LMOP to an ambient temperature from the holding temperature, and degassing the suspended LMOP. Degassing can include flowing an inert gas over the suspended LMOP, wherein the inert gas includes Argon or Helium, but does not include Nitrogen.

Suspending the LMOP within the gaseous mixture can include feeding the gaseous mixture to a reaction chamber, wherein the reaction chamber includes an outer wall containing an annular gas path therein surrounding an internal chamber configured to enclose the LMOP. The gaseous mixture can be fed through a porous media located in a bottom portion of the internal chamber in order to suspend the LMOP. Degassing the suspended LMOP can take place within the internal chamber.

The suspended LMOP can be incrementally heated, predominantly by convection, ramping to 200 degrees Celsius at 5 degrees/minute and then ramping to the holding temperature at a rate of between 10° C./min and 15° C./min, and then held at that temperature for between 1 and 10 hours.

The LMOP can consist of a commercially available powder and be selected from a group consisting of $LiMn_2O_4$, $LiMnO_2$, $LiNi_{0.8}Co_{0.15}Al_{0.5}O_2$, $LiM_{1.5}Ni_{0.5}O_4$, or a combination thereof. The LMNP can be selected from a group consisting of $Li_xMn_{y-x}N$, $Li_xMn_{y-x}Ni_yN$, $LiMn_{y-x}Ni_zN$, or a combination thereof or specifically, $Li_{7.9}MnN_{3.2}O_{1.6}$, $Li_7MnN_4$, $Li_{2.6}Co_{0.2}Cu_{0.2}N$, $Li_{2.6}Co_{0.4}N$, $Li_{2.5}Co_{0.2}Cu_{0.1}N_{0.1}N$, or a combination thereof. The gaseous mixture can include gas selected from a group consisting of $N_2$, $H_2$, He, $NH_3$, Ar, or a combination thereof.

These and other features of the methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
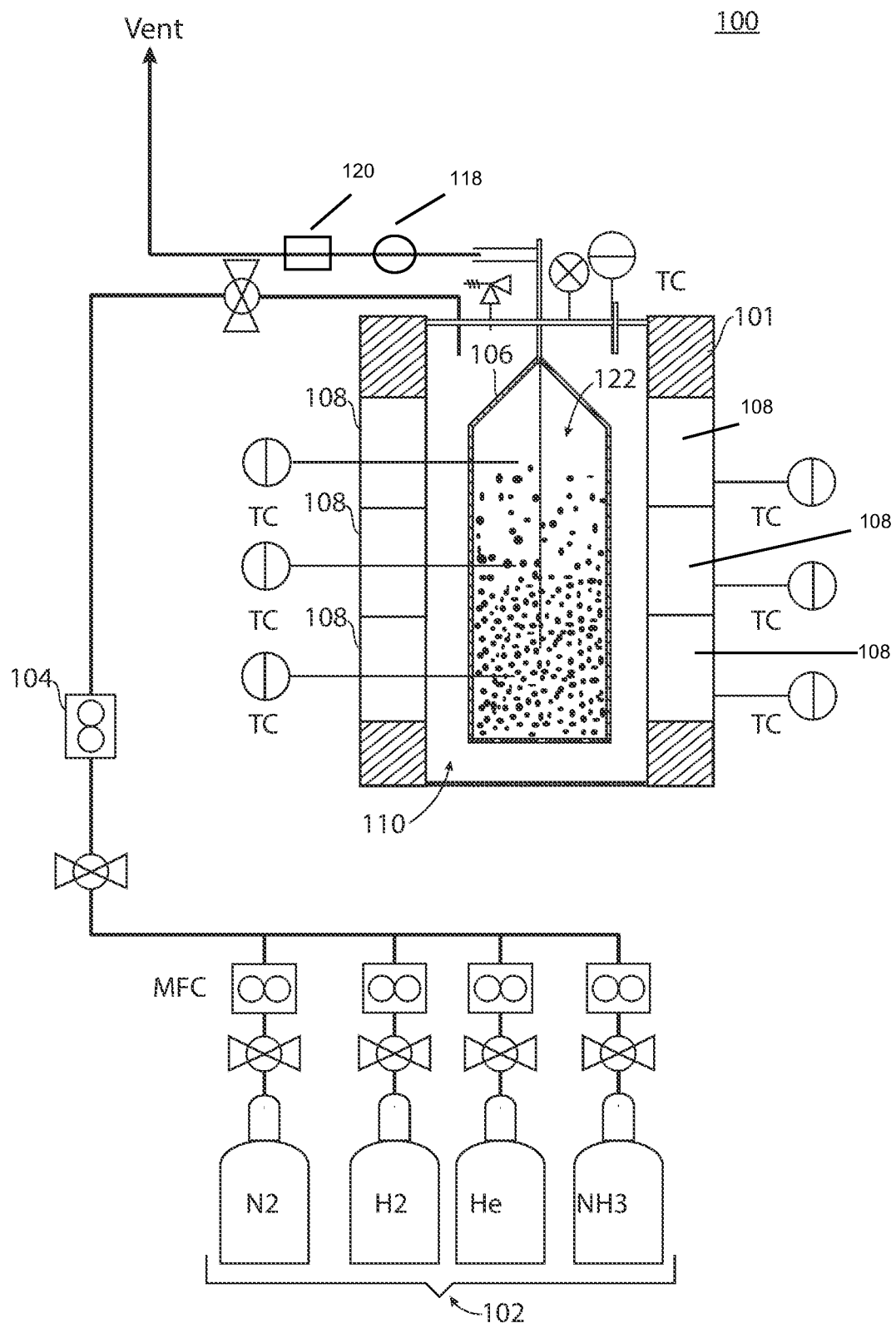
FIG. 1 is a schematic view of a reactor including lithium-metal-oxide-powder.

Reference will now be made to the drawings wherein like reference numerals identify similar structural features or aspects of the subject invention. For purposes of explanation and illustration, and not limitation, a partial view of an exemplary embodiment of a reactor in accordance with the disclosure is shown in FIG. 1 and is designated generally by reference character 100. Other steps of the disclosure are provided in FIGS. 2-4, as will be described. The methods of the disclosure can be used to produce lithium-metal nitride powder using safe commercial lithium metal oxide powders while reducing handling risks and process times, and increasing efficiency.

FIG. 1 shows a reactor 100 used for producing lithium-metal nitride powder (LMNP). Lithium-metal-oxide-powder (LMOP) 122 is shown with an internal chamber or fluidized bed 106. LMOP consists of a commercially available powder, such as $LiMn_2O_4$, $LiMnO_2$, $LiNi_{0.8}Co_{0.15}Al_{0.05}O_2$, or $LiM_{1.5}Ni_{0.5}O_4$. The reactor 100 includes a gas source 102, a mass flow controller 104, and a fluidized bed reactor 106 for holding the initial powder, mixing the powder with various gasses, and heating the mixture. The fluidized bed reactor 106 can include a series of individual heating zones 108, which ensure that the fluidized bed reactor 106 evenly heated.

Figure 2:
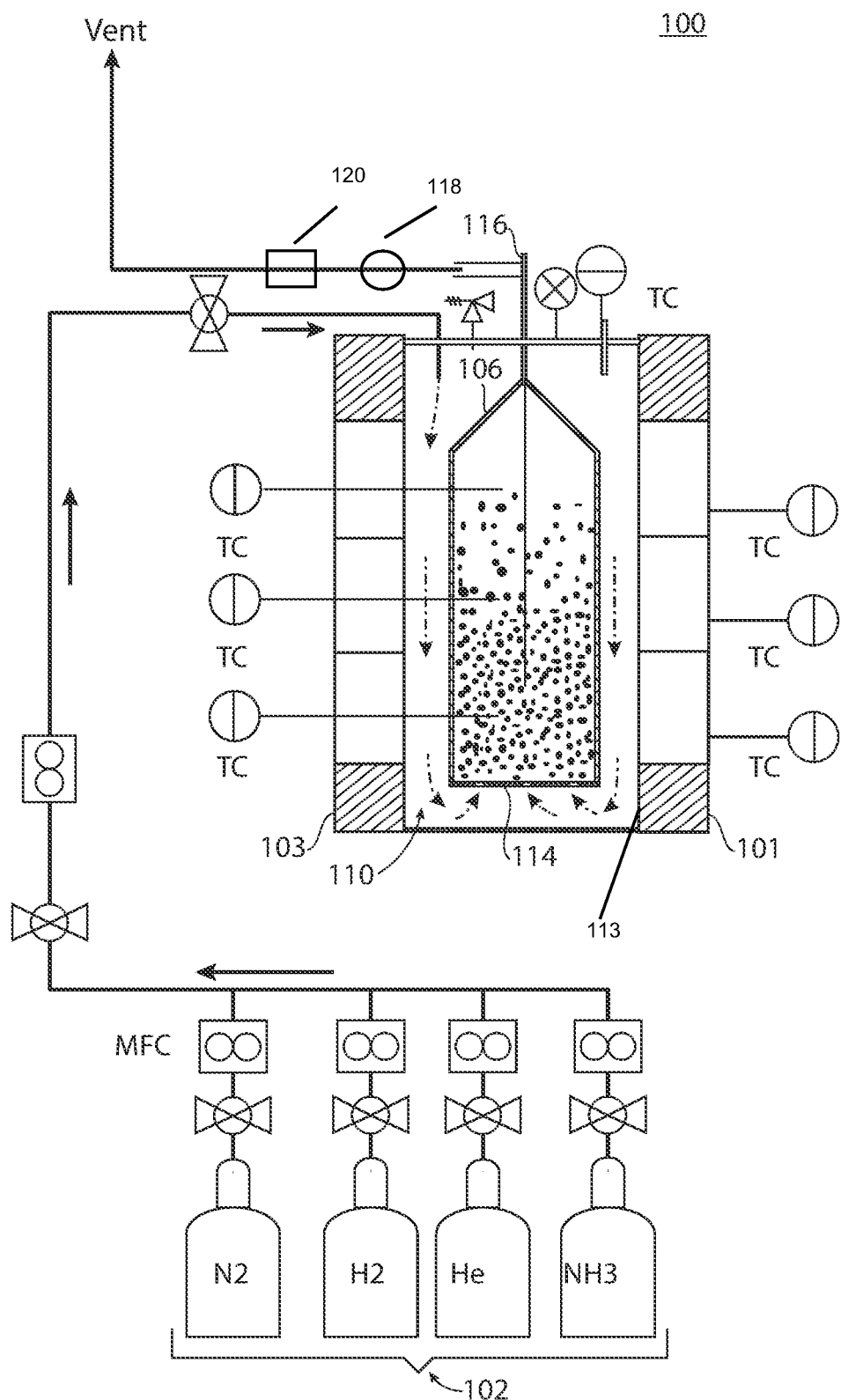
FIG. 2 is a schematic view of a reactor of FIG. 1, showing a flowing gaseous mixture.

FIG. 2 shows a gaseous mixture, such as $N_2$, $H_2$, He, $NH_3$, Ar, or a combination there of, flowing from the gas source 102 and suspending the LMOP within a gaseous mixture. The gaseous mixture is fed to the reaction chamber 101, wherein the reaction chamber 101 includes an outer wall 103, an inner wall 113, and the annular gas path 110 therein surrounding the internal chamber 106. The gaseous mixture is fed through the porous media 114 located in a bottom portion of the internal chamber 106 in order to suspend the LMOP. Gasses can then be vented through a venting system 116 located opposite the porous media 114, which includes a particulate trap 118 and moisture trap 120.

Figure 3:
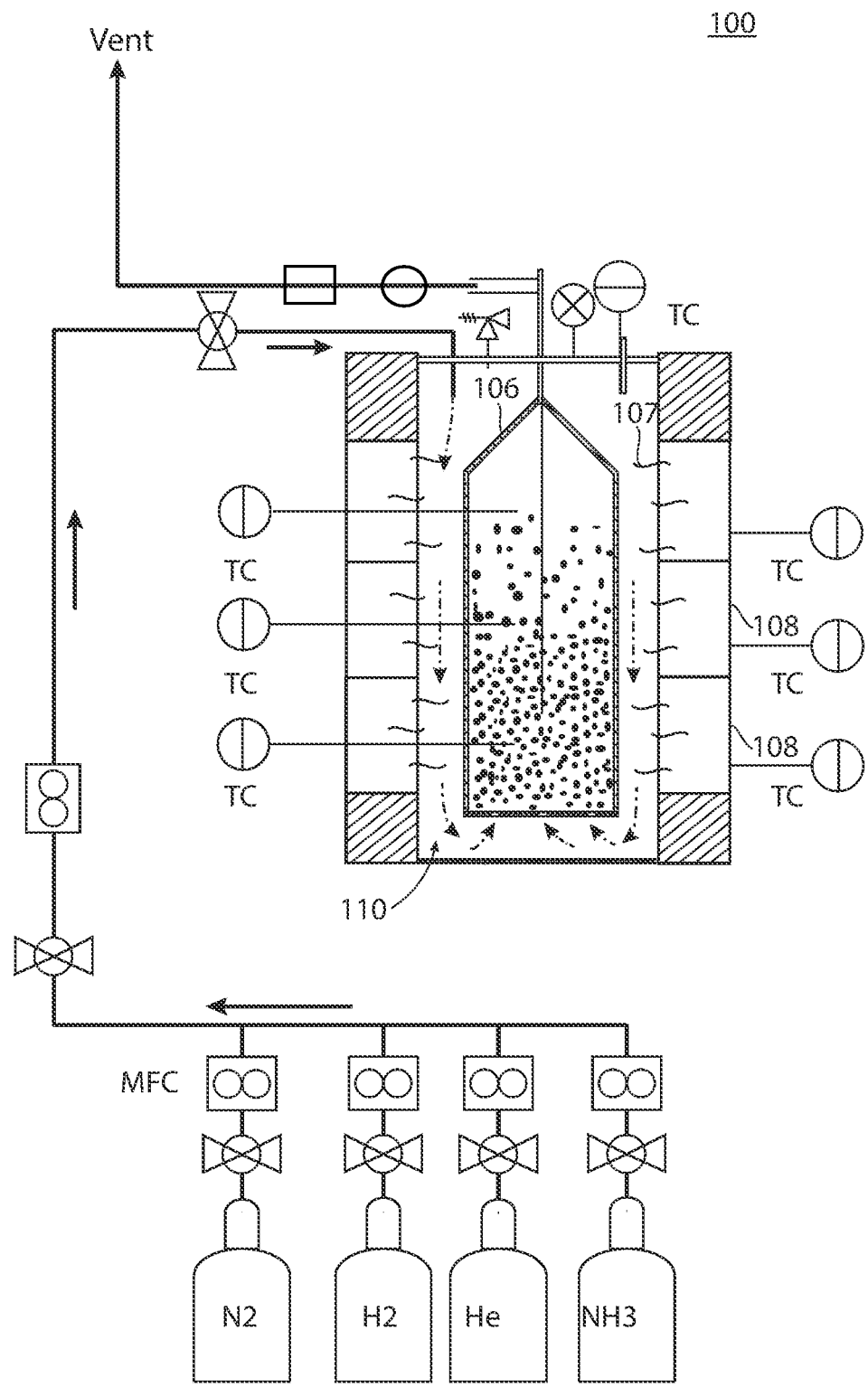
FIG. 3 is a schematic view of a reactor of FIG. 1, showing a heated suspension.

FIG. 3 shows the suspended LMOP being incrementally heated using a series of individual heating zones 108 to a holding temperature of between 400 and 800 degrees Celsius, preferably 700 degrees Celsius and maintaining the LMOP at the holding temperature for a given time period in order for the gaseous mixture and the LMOP to react. LMOP is incrementally heated, predominantly by convection, ramping to approximately 200 degrees Celsius at approximately 5 degrees/minute and then ramping to the holding temperature at a rate of between 10 C/min and 15 C/min, and then held at that temperature for between 1 and 10 hours. The temperature and time depends on the bulk powder LMOP, specifically, the density, metal content, and powder composition. After reacting and forming LMNP, such as $Li_xMn_{y-x}N$, $Li_xMn_{y-x}Ni_nN$, $LiMn_yNi_zN$, the powder is cooled to an ambient temperature. The ambient temperature can be approximately room temperature.

Figure 4:
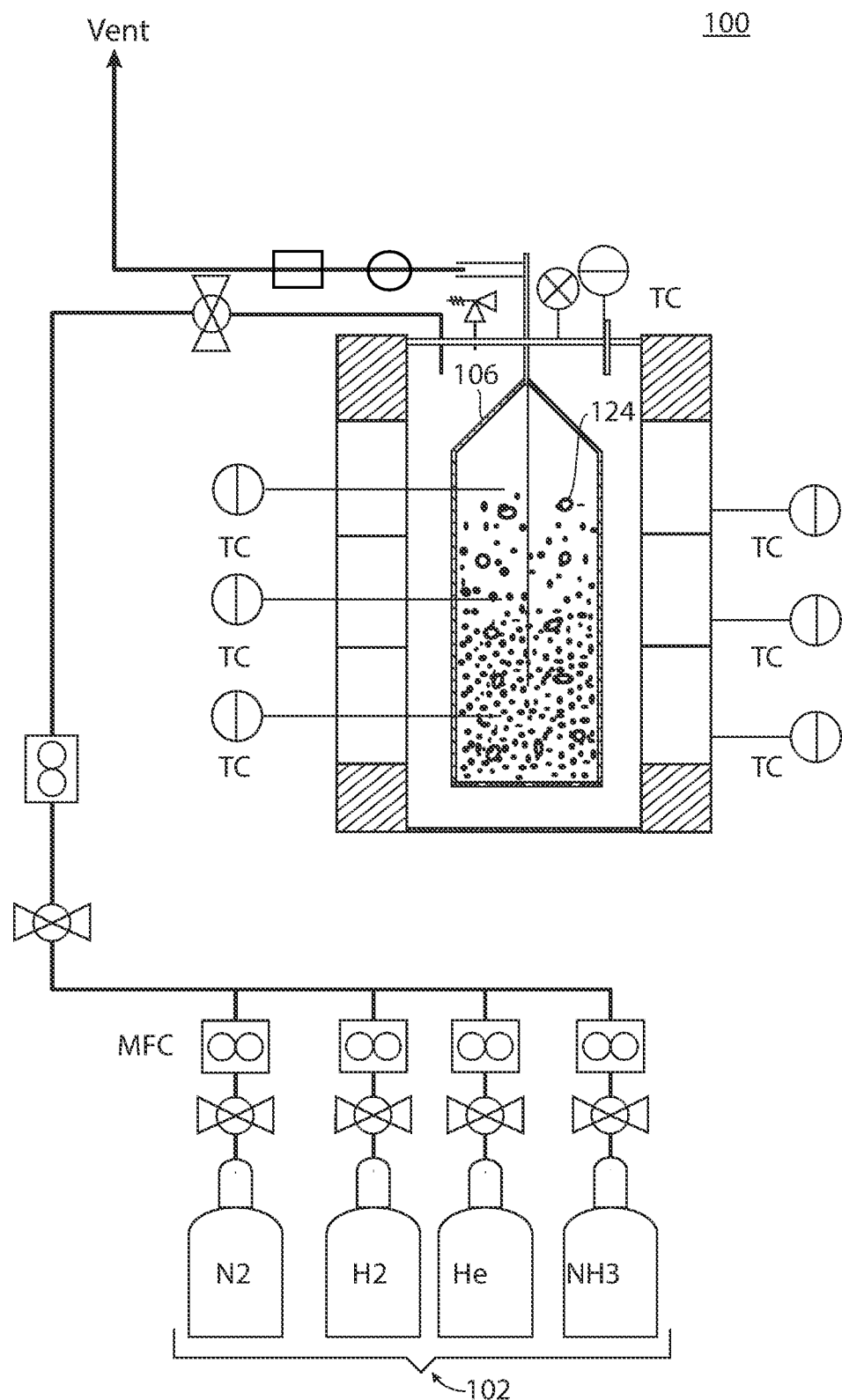
FIG. 4 is a schematic view of a reactor of FIG. 1, showing a resultant lithium-metal nitride.

FIG. 4 shows a formed a lithium-metal nitride powder 124 (LMNP) within the fluidized bed 106. The formed LMNP 124 can be degassed from the gas source 102 using an inert gas. Specifically, the inert gas includes Argon or Helium, and specifically excludes Nitrogen in order to preclude any further reaction. At this point, the LMNP 124 can further be coated within the fluidized bed 106. The coating can consist of an appropriately selected polymer, such as polyvinylidene fluoride (PVDF) which can aid in ensuring proper operation of the Li-ion batteries. Binders function as a polymeric matrix that connects active materials to one another and to the current collector in a composite Li-ion battery electrode. The binder also accommodates volume changes due to de-/lithiation of active materials during battery operation. High binding strength, favorable mechanical properties to accommodate volume changes, high electronic conductivity, porous structure for high ionic conductivity, and chemical inertness are key characteristics of a quality binder. Several different electroactive polymers such as polyaniline and polypyrrole can be used instead of PVDF. Both improve the rate capability and cycle life of intrinsically poor electronic conductivity (as in $LiFePO_4$) while the polyaniline binder improves irreversible capacity loss during the first cycle in a graphite anode. This use of LMNP in powder form allows the coating to cover a larger surface area to coated surface area ratio than traditional methods, which coat material in pellet form.

The methods of the present disclosure, as described above and shown in the drawings, provide for lithium-metal nitride powder production methods with superior properties including increased safety and reduced cost and complexity. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of forming a battery electrode comprising:
suspending a lithium-metal-oxide-powder (LMOP) within a gaseous mixture;
incrementally heating the suspended LMOP to a holding temperature of between 400 and 800 degrees Celsius such that the LMOP reaches the holding temperature;
maintaining the LMOP at the holding temperature for a time period in order for the gaseous mixture and the LMOP to react to form a lithium-metal nitride powder (LMNP); and
forming a battery electrode using the LMNP, further comprising degassing the suspended LMOP.

2. The method of claim 1, further comprising cooling the suspended LMOP to an ambient temperature from the holding temperature.

3. The method of claim 1, wherein degassing flowing an inert gas over the suspended LMOP.

4. The method of claim 3, wherein the inert gas includes Argon or Helium.

5. The method of claim 4, wherein the inert gas does not include Nitrogen.

6. The method of claim 1, wherein suspending the LMOP within the gaseous mixture includes feeding the gaseous mixture to a reaction chamber, wherein the reaction chamber includes an outer wall containing an annular gas path therein surrounding an internal chamber configured to enclose the LMOP.

7. The method of claim 6, further comprising feeding, the gaseous mixture is fed through a porous media located in a bottom portion of the internal chamber in order to suspend the LMOP.

8. The method of claim 6, further comprising degassing the suspended LMOP within the internal chamber.

9. The method of claim 1, further comprising heating the suspended LMOP at a rate of 5 degrees Celsius per minute to 200 degrees Celsius and then 10 to 15 degrees per minute to the holding temperature.

10. The method of claim 9, further comprising incrementally heating the suspended LMOP to the holding temperature predominantly by convection.

11. The method of claim 1, further comprising maintaining the holding temperature for between 1 and 10 hours, inclusive.

12. The method of claim 1, wherein the LMOP consists of a commercially available powder.

13. The method of claim 1, wherein the LMOP is selected from a group consisting of $LiMn_2O_4$, $LiMnO_2$, $LiNi_{0.8}Co_{0.15}Al_{0.05}O_2$, $LiM_{1.5}Ni_{0.5}O_4$, or a combination thereof.

14. The method of claim 1, wherein the LMNP is selected from a group consisting of $Li_xMn_{y-x}N$, $Li_xMn_{y-x}Ni_nN$, $LiMn_{y-x}Ni_zN$, or a combination thereof.

15. The method of claim 14, wherein the LMNP is selected from a group consisting of [$Li_{7.9}MnN_{3.2}O_{1.6}$, $Li_7MnN_4$, $Li_{2.6}Co_{0.2}Cu_{0.2}N$, $Li_{2.6}Co_{0.4}N$, $Li_{2.5}Co_{0.2}Cu_{0.1}Ni_{0.1}N$, or a combination thereof.

16. A method of forming a battery electrode comprising:
suspending a lithium-metal-oxide-powder (LMOP) within a gaseous mixture;
incrementally heating the suspended LMOP to a holding temperature of between 400 and 800 degrees Celsius such that the LMOP reaches the holding temperature;
maintaining the LMOP at the holding temperature for a time period in order for the gaseous mixture and the LMOP to react to form a lithium-metal nitride powder (LMNP);
degassing the suspended LMOP; and
forming a battery electrode using the LMNP.

17. A method of forming a battery electrode comprising:
suspending a lithium-metal-oxide-powder (LMOP) within a gaseous mixture, wherein suspending the LMOP within the gaseous mixture includes feeding the gaseous mixture to a reaction chamber, wherein the reaction chamber includes an outer wall containing an annular gas path therein surrounding an internal chamber configured to enclose the LMOP;
feeding the gaseous mixture through a porous media located in a bottom portion of the internal chamber in order to suspend the LMOP;
incrementally heating the suspended LMOP to a holding temperature of between 400 and 800 degrees Celsius such that the LMOP reaches the holding temperature;
maintaining the LMOP at the holding temperature for a time period in order for the gaseous mixture and the LMOP to react to form a lithium-metal nitride powder (LMNP);
degassing the suspended LMOP; and
forming a battery electrode using the LMNP.

18. The method of claim 1, wherein the gaseous mixture includes gas selected from a group consisting of $N_2$, $H_2$, He, $NH_3$, Ar, or a combination thereof.

* * * * *